P. M. BELLARD.
DEVICE FOR GAGING CIRCULAR WORK.
APPLICATION FILED MAR. 9, 1917.
1,308,324.
Patented July 1, 1919.
2 SHEETS—SHEET 1.
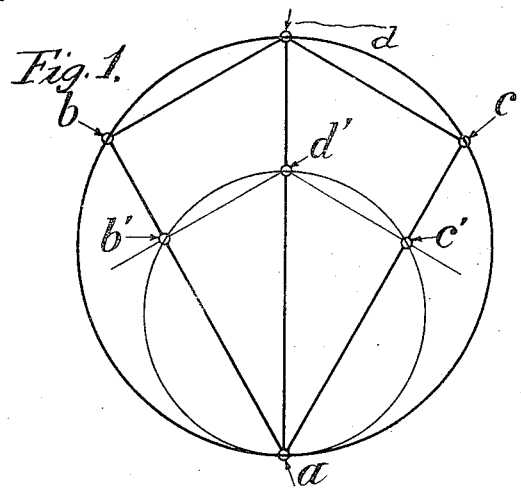
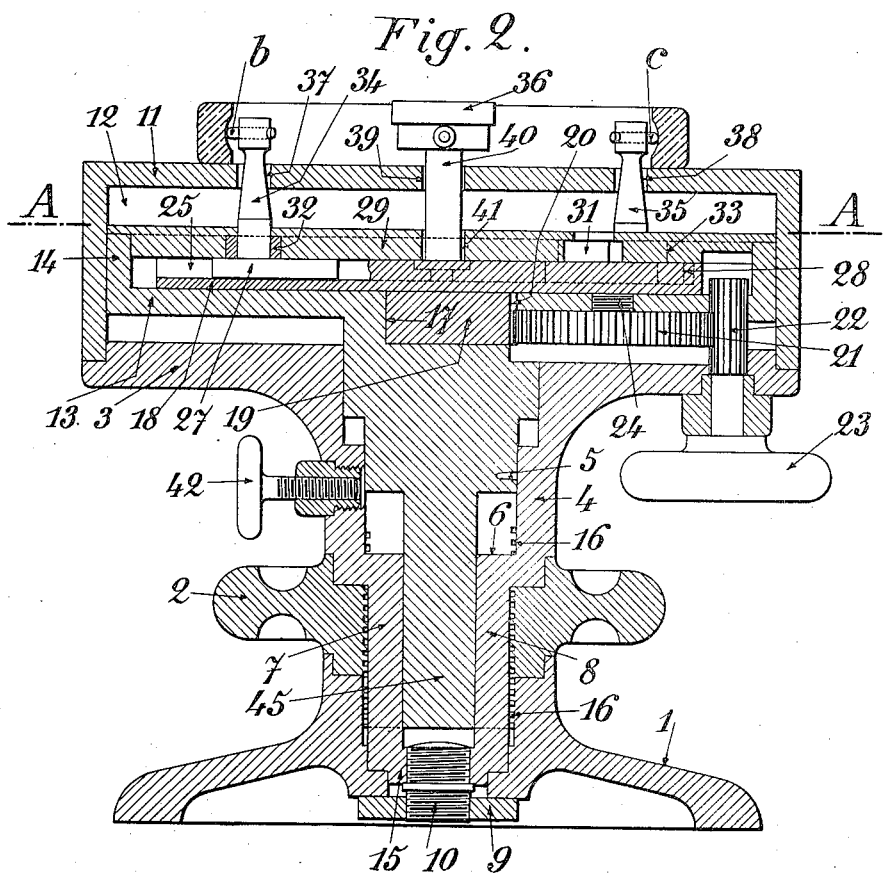
Inventor
Paul Marius Bellard
By Wm Wallace White
Attorney.

UNITED STATES PATENT OFFICE.

PAUL MARIUS BELLARD, OF IVRY PORT, FRANCE, ASSIGNOR TO COMPAGNIE D'APPLICATIONS MECANIQUES, OF IVRY PORT, FRANCE.

DEVICE FOR GAGING CIRCULAR WORK.

1,308,324. Specification of Letters Patent. Patented July 1, 1919.

Application filed March 9, 1917. Serial No. 153,552.

*To all whom it may concern:*

Be it known that I, PAUL MARIUS BELLARD, citizen of the Republic of France, residing at 42 Rue Franklin, Ivry Port, Seine, in the Republic of France, have invented new and useful Improvements in a Device for Gaging Circular Work, of which the following is a specification.

The present invention consists of an improved device which is designed to make comparison between various diameters, interior or exterior, of a given series, and also to determine any irregularities or depressions. Such irregularities may have but a small value, but they occur frequently and are a great drawback, especially when it is desired to obtain annular grooves whose outer edge should have a very exact circular path, such for instance as the grooves which are turned in the interior of the outer rings employed for ball bearings.

The device which is designed according to the present invention consists in principle of a system of four separate contact points. In the case where the circumference of a circle is to be verified, these points bear upon four different points of this circumference, and form the apices of a quadrilateral of which two of the opposite angles are right angles, so that the four contact points always lie in the circumference of a circle of which the line joining the other two angles is a diameter. This line may be supposed to carry at one end a contact point connected with a multiplying indicator device, while the other points of the quadrilateral may vary slightly by working against a spring, and in such case, the multiplying device will give exact indications as to the value of the diameter of the piece to be verified, if this piece is checked up at its different points. This quadrilateral can be made larger or smaller while keeping to the same proportions, according to the size of the circumference to be tested. A device constructed according to this principle will give the measurement of the diameters by comparison with certain standards, and it will indicate in a direct manner the differences due to irregularities or to depressions such as are found for instance in the internal grooves of ball bearings.

The accompanying drawings show an illustrative example of a device of this kind, in which:

Figure 1 represents a diagram in which the heavy lines indicates the position of the contact points for the gaging circular work having a given diameter, while the fine lines indicate the position which these same contact points would occupy for the gaging circular work having a smaller diameter.

Fig. 2 represents a vertical section of a device which is specially designed for comparison and gaging of the periphery of internal grooves in the outer rings of ball bearings.

Figure 3:
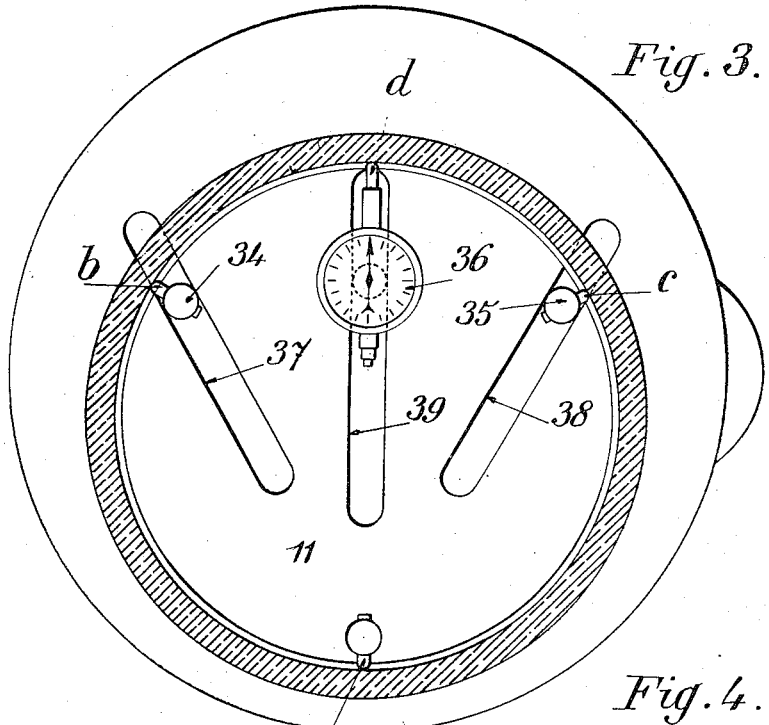
Fig. 3 represents a plan view of the same device.
Figure 5:
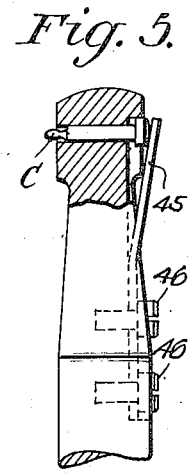
Fig. 5 is an enlarged detail view showing in side elevation and partly in section a spring-actuated contact member.
Figure 6:
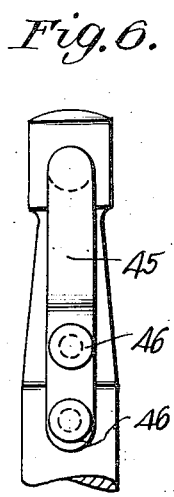
Fig. 6 is a view at right angles to Fig. 5.
Figure 4:
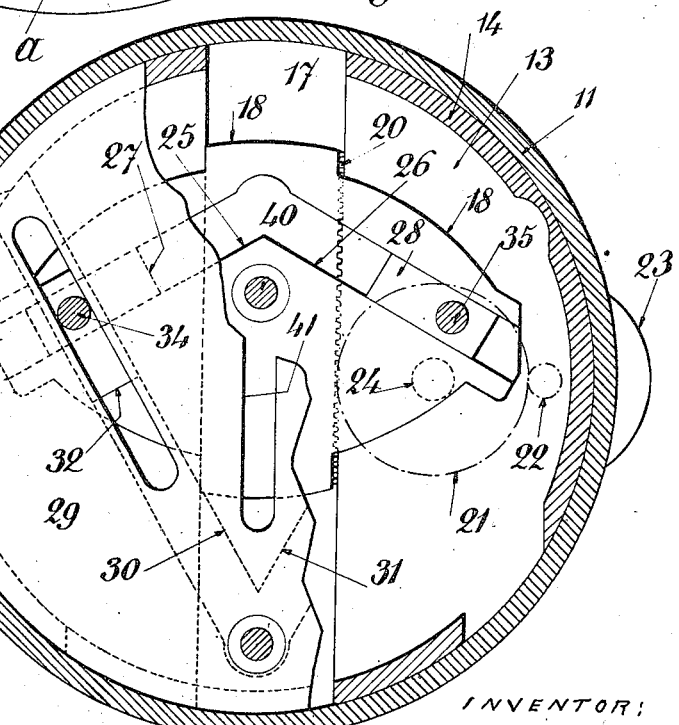
Fig. 4 represents a horizontal section according to the line A—A of Fig. 2.

In the diagram represented in Fig. 1, the points $a$, $b$, $c$ are supposed to form an equilateral triangle. The pieces to be gaged with the present device do not vary to any great extent from perfect circles, if we suppose that the point $c$ acts by means of a spring pressure so as to press the piece being gaged against the points $a$ and $b$, the line $a$—$d$ may be considered as practically a diameter for all the points of the piece to be gaged and therefore if the point $d$ is connected to a multiplying indicator device the variations of the dial hand of this device will indicate the exact differences in the diameters.

In order to explain the construction and the working of the present device, it will be observed that the points $a$, $b$, $c$, $d$ are represented by contact pieces; the contact piece $a$ is fixed, while the contact pieces $b$, $c$, $d$ are displaceable by a single piece in the form of a segment upon which is mounted in fixed position the piece carrying the contact $d$, and the other two contacts $b$ and $c$ are disposed so as to slide respectively according to the lines $a\ b$ and $b\ d$ on the one hand and $a\ c$ and $c\ d$ on the other hand, during their displacement which takes place parallel to the diagonal or diameter $a\ d$.

In the present device, 1 represents a base upon which is mounted a nut in the form of a fly wheel 2, and a circular plate 3 which is continued at the lower part by a cylindrical part 4; the latter has a cylindrical bore 5 of the required depth reaching to the bottom 6, and from this point the cylindrical part 4 has a smaller diameter and is disposed so as to possess two tongues 7 and 8 which terminate in a circular part 15; this latter bears upon the base 1. A screw 10 is provided in the circular part 15 and by means of the nut 9 the whole of the preceding parts can be rigidly fixed.

The device possesses a circular cover 11 which fits upon the plate 3 and forms with the latter a box 12 containing in the interior the various pieces which can be displaced in order to adjust the contact pieces, such displacement being carried out with reference to the height of the pieces as well as the diameter of the work to be verified.

The plate 13 with annular periphery is designed to receive a vertical displacement in the interior of the box 12, and this plate is continued below by a cylindrical portion 45 carrying a screw thread which corresponds to the thread 16 of the nut 2; this portion is slotted so as to form two grooves in which are fitted the two tongues 7 and 8, and this disposition is employed in order to prevent the plate 13 from rotating and to guide this plate vertically in its upward or downward movement when displaced by the rotation of the nut 2. In the plate 13 is a horizontal groove 17 which passes along the entire diameter and serves to guide the piece 18 of segment shape which carries a projection 19 designed to slide in the groove; the piece 19 carries a rack 20 which works together with the speed reducing pinion 21 and this in turn is operated by the pinion 22 mounted on the shaft of a small hand wheel 23. The pinion 22 works upon a shaft 24 turning in the plate 13.

The piece 18 carries two grooves 25 and 26 in which move respectively the two sliding pieces 27 and 28. This piece 18 is held between the plate 13 and a disk 29 which fits upon the annular flange 14, and has also two grooves 30 and 31 which are respectively disposed perpendicular to the grooves 25 and 26 of the piece 18, and in which the other two sliding pieces 32 and 33 are designed to move. The sliding pieces 27 and 32 on the one hand and the sliding pieces 28 and 33 on the other, are mounted together and lie perpendicular to each other, and if required, such pairs could be replaced by a single piece of the same cross shape. Upon these pairs of slides are fixed the standards 34 and 35 which carry respectively the contact points $b$ and $c$. The contact point $c$ is constantly pressed toward the exterior by a leaf spring 45 which is regulated as desired by the screws 46, and said spring exerts its pressure in a direction perpendicular to $ab$; the point $c$ works in connection with a suitable checking mark, so as to readily note the position which said point should occupy when making rapid comparisons by the direct measurement of diameters.

The piece 18 carries the fourth contact point $d$ which in the present apparatus acts directly upon a multiplying indicator 36. It is however understood that in smaller apparatus where there is not sufficient space between the contact pieces for mounting the indicator 36, this latter can be placed on the outside in a horizontal or vertical plane and can be operated by any suitable means of transmission from the contact piece $d$. The cover plate 11 is turned with great care and possesses three slots 37, 38 and 39, the slots 37 and 38 are disposed respectively above the slots 30 and 31, and allow the standards 34 and 35 to pass, while the slot 39 is disposed above the slot 41 in the disk 29; these last two disks are disposed to allow the passage of the standard 40 which carries a contact point and upon which is mounted the multiplying indicator 36. A set screw device 42 allows of fixing the different pieces at any desired height, while another set screw (not shown here) acts in connection with the pieces used in the measurement of a diameter in order to fix them in any desired position. It is understood that the contact points $a, b, c$ and $d$ may also be turned toward the inside in order to be able to use the apparatus for the verification of exterior diameters. The general method of verification is as follows:

The apparatus is first standardized by adjusting it upon a standard bore or diameter by means of the hand wheel 23 and the intermediate parts 22, 21, 20 and 18, after which the hand wheel or nut 2 is operated so as to bring the contact points within the annular groove which is to be tested, then the two regulating systems are set in fixed position and the apparatus is employed for the verification of all the pieces belonging to the same series.

Having now described my invention, what I claim as new and desire to secure by Letters Patent is:

1. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, and means connected to the index contact piece and adapted to show the distance between the normal position of said index contact piece and its actual position when in contact with the circular work to be gaged.

2. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, means connected to the index contact piece and adapted to show the distance between the normal position of said index contact piece and its actual position when in contact with the circular work to be gaged, and means carried by said support and connected to the second contact piece and the index contact piece and adapted to displace the same simultaneously in such a manner that they are always at the corresponding apices of similar right angle triangles.

3. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, means connected to the index contact piece and adapted to show the distance between the normal position of said index contact piece and its actual position when in contact with the circular work to be gaged, and a spring actuated contact piece carried on the same support as the other contact pieces and adapted to bear on the circular work to be gaged and force the first contact piece and the second contact piece against the surface of said circular work.

4. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, means connected to the index contact piece and adapted to show the distance between the normal position of said index contact piece and its actual position when in contact with the circular work to be gaged, and a spring actuated contact piece carried on the same support as the other contact pieces and adapted to bear on the circular work to be gaged and force the first contact piece and the second contact piece against the surface of said circular work, said spring actuated contact piece being located at one apex of an equilateral triangle the first contact piece and the second contact piece being located at the other apices of said triangle, respectively.

5. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, means connected to the index contact piece and adapted to show the distance between the normal position of said index contact piece and its actual position when in contact with the circular work to be gaged and a spring actuated contact piece carried on the same support as the other contact pieces and adapted to bear on the circular work to be gaged and force the first contact piece and the second contact piece against the surface of said circular work, said spring actuated contact piece being located at one apex of an equilateral triangle the first contact piece and the second contact piece being located at the other apices of said triangle, respectively, and means carried by said support and connected to the second contact piece, the index contact piece and the spring actuated contact piece and adapted to displace the same simultaneously in such a manner that the second contact piece and the index contact piece are always at the corresponding apices of similar right angle triangles and the spring actuated contact piece still forms with the second contact piece and the first contact piece an equilateral triangle.

6. A device for gaging circular work comprising in combination, a first contact piece, a second contact piece and an index contact piece, a support carrying said contact pieces in such relative positions that the first contact piece and the index contact piece are normally at the ends of the hypotenuse of a right angled triangle and the second contact piece at the apex of the right angle, means connected to the index contact piece and adapted to show the distance between the normal position of said index contact piece and its actual position when in contact with the circular work to be gaged and a spring actuated contact piece carried on the same support as the other contact pieces and adapted to bear on the circular work to be gaged and force the first contact piece and the second contact piece against the surface of said circular work, said spring actuated contact piece being located at one apex of an equilateral triangle the first contact piece and the second contact piece being located at the other apices of said triangle, respectively, and means carried by said support and connected to the second contact piece, the index contact piece and the spring actuated contact piece and adapted to displace the same simultaneously in such a manner that the second contact piece and the index contact piece are always at the corresponding apices of similar right angle triangles and the spring actuated contact piece still forms with the second contact piece and the first contact piece an equilateral triangle, and means adapted to bodily displace the said support in a direction at right angles with the plane containing the contact pieces.

7. A device for gaging circular work comprising in combination; a horizontal circular plate provided with a groove lying along one of its diameters; means for giving a vertical displacement to said plate; a movable piece of segment shape resting upon said plate and provided upon its upper side with two grooves arranged at an obtuse angle to each other and having said diameter as an axis of symmetry; a projection provided on the under side of said segment piece and engaging in the diametral groove in said plate; means for displacing said projection along said groove; two movable pieces which slide each within one of the grooves in said segment plate; a contact piece mounted upon the segment piece and lying in the said axis of symmetry, an indicator connected to said contact piece and adapted to show the distance between the normal position of said contact piece and its actual position when in contact with the circular piece to be gaged, a fixed disk mounted above the segment piece and provided with two slots intersecting in said axis of symmetry and respectively perpendicular to the slots in the segment piece; a contact piece mounted upon said disk at the intersection of the grooves; in the same two movable sliding pieces each of which moves within one of said grooves and which are respectively integral with the other two sliding pieces; two contact pieces each of which is carried by one of the said sliding pieces; a spring acting upon one of these contact pieces; means for clamping the movable contact pieces and means for inclosing the apparatus and for supporting the circular piece to be gaged substantially as described and for the purpose set forth.

8. A device for gaging circular work comprising in combination, a hollow support; a hand wheel mounted upon this support and forming a nut; a cylindrical piece engaging in the support and screwing into the hand wheel or nut; means for preventing the rotation of the piece; means for clamping said piece at any desired height; a horizontal circular plate integral with said piece and provided with a groove along one of its diameters; a movable piece of segment shape resting upon said plate and provided upon its upper side with two grooves arranged at an obtuse angle to each other and having said diameter as an axis of symmetry; a projection on the under side of said segment piece and provided with a rack, and engaging in the diametral groove of the plate; a pinion mounted on said plate and engaging with said rack; a toothed drum operating said pinion; two movable sliding pieces, each of which moves within one of the two grooves in said segment pieces a contact piece mounted upon the segment piece and lying in the said axis of symmetry; an indicator connected to said contact piece and adapted to show the distance between the normal position of said contact piece and its actual position when in contact with the circular piece to be gaged, a fixed disk mounted above the segment piece and provided with two slots intersecting in said diameter and respectively perpendicular to the grooves in the segment piece; a contact piece mounted upon said disk at the intersection of the grooves in the same, two sliding pieces each of which moves within one of said grooves and which are respectively integral with the other two sliding pieces; two contact pieces each of which is carried by one of the said sliding pieces, a spring acting upon one of these contact pieces; means for clamping the movable contact pieces; and a cover for inclosing the apparatus and supporting the circular piece to be gaged substantially as described and for the purpose set forth.

In testimony whereof I have signed my name to this specification in the presence of two subscribing witnesses.

PAUL MARIUS BELLARD.

Witnesses:
LOUIS MOSES,
CHAS. P. PRESSLY.